Dec. 2, 1969 J. JABLONSKI 3,481,199
DISPLACEMENT MEASURING DEVICE
Filed Aug. 10, 1967 2 Sheets-Sheet 1

INVENTOR
JAN JABLONSKI
BY
ATTORNEYS

Dec. 2, 1969  J. JABLONSKI  3,481,199
DISPLACEMENT MEASURING DEVICE
Filed Aug. 10, 1967  2 Sheets-Sheet 2
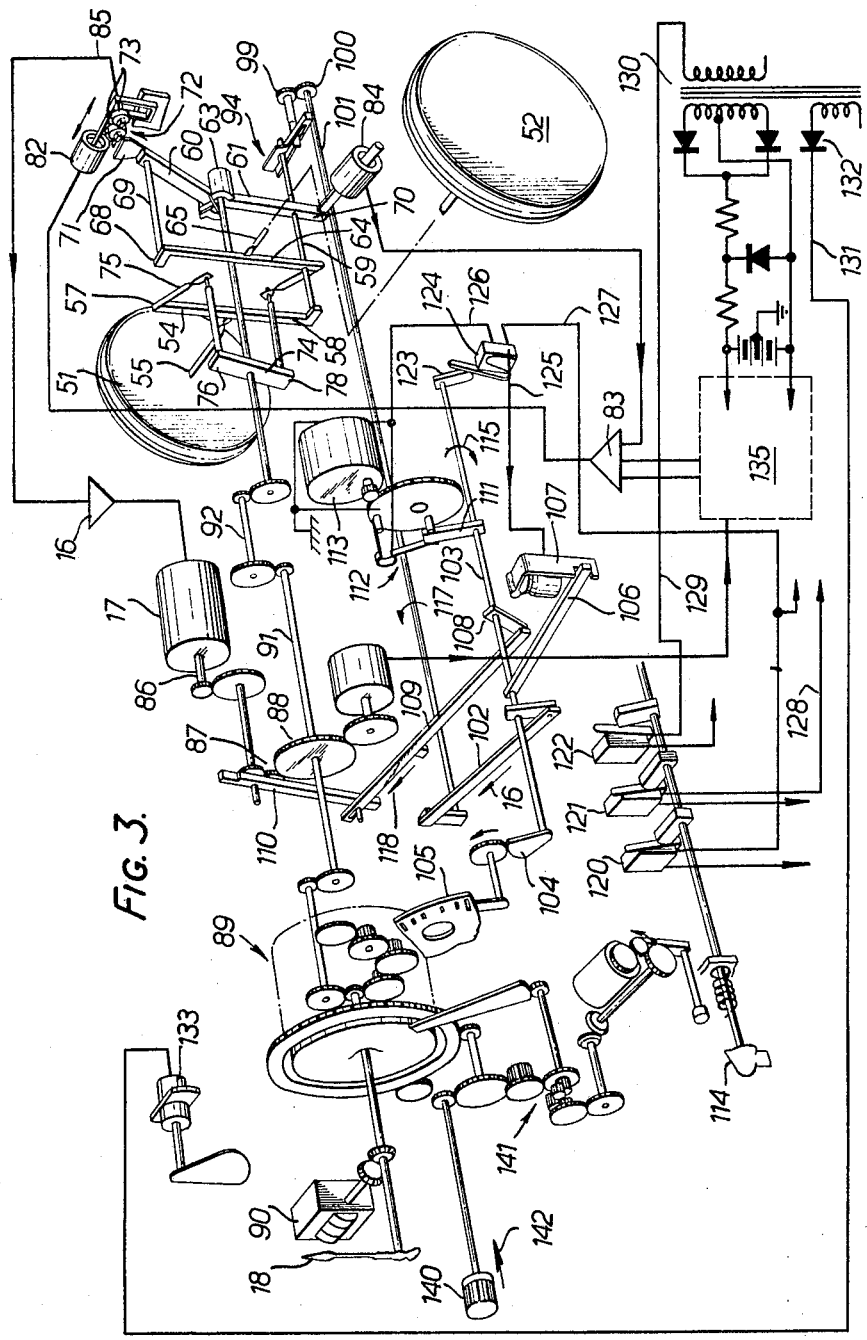
INVENTOR
JAN JABLONSKI
BY
Bradford & Gardner
ATTORNEYS

3,481,199
DISPLACEMENT MEASURING DEVICE
Jan Jablonski, London, England, assignor to Elliott Brothers (London) Limited, London, England, a British company
Filed Aug. 10, 1967, Ser. No. 659,625
Claims priority, application Great Britain, Aug. 12, 1966, 36,174/66
Int. Cl. G01l 7/20
U.S. Cl. 73—384                                8 Claims

ABSTRACT OF THE DISCLOSURE

A device for measuring a displacement which includes a beam arrangement operable to transmit a displacement signal from a pressure responsive capsule to an indicating instrument, for example, an altimeter. A feedback is provided which can nullify movement of the beam arrangement to cause the device to operate in a null mode, and a clamp is provided which is operable to modify the mode of operation of the beam arrangement so that the device can operate selectively in the null mode or in a mode in which the feedback is inoperative to nullify the beam arrangement.

---

This invention relates to measuring devices.

According to a first aspect of the invention a device for measuring a displacement includes means for transmitting a displacement signal to provide output means with an output signal representing the displacement, feedback means arranged to nullify the transmitting means (and thereby cause the apparatus to operate in a null mode), and means for modifying the mode of operation of the transmitting means in such manner that the latter can operate selectively either in the said null mode or in a mode in which the feedback means are not operative to null the transmitting means.

According to a second aspect of the invention a device for measuring a dispacement includes means arranged to transmit the said displacement, transducer means including an amplifier arranged to cooperate with the transmitting means, mechanical means arranged to cooperate with the transmitting means wherein in a first operational state the transmitting means transmits said displacement to the input of the transducer means, the transducer means transduces and amplifies the transmitted displacement to provide an output representing the said displacement, the mechanical means is responsive to the said output and acts to nullify the input to the transducer means and wherein in a second operational state the transmitting means is constrained to transmit the said displacement by way of the mechanical means to provide an output representing the said displacement. In the second operational state the transmitting means is preferably constrained to maintain the input to the transducer means at zero. Preferably the output resulting from both operational states is displacement and the output in the first operational state is provided by a motor, included in the transducer means, responsive to the output of the amplifier. The transducer means is preferably electrically operated but may alternatively be pneumatically, hydraulically or mechanically operated either exclusively or in any combination. The output may be used to move the needle of an indicating instrument or the counter wheels of a digital display.

In one form of the invention the displacement to be measured is the change in output of a pressure/displacement transducer resulting from a change of pressure therein. The transmitting means in the second operational state may be constrained by a clamp which may be manually or automatically operated and may, for example, be operated in the event of failure of the transducer means.

In one embodiment of the invention the transmitting means includes a differential beam arranged to be deflected at one end by the change in output of a single pressure/displacement transducer and a detector beam arranged to be deflected by the said deflection of the differential beam, the transducer means includes an inductive pickoff arranged to sense the said deflection of the detector beam and to provide an output which is fed to the amplifier the output from which drives the motor, the indicating instrument is arranged to be operated by the motor output, the mechanical means includes a rocking arm an antibacklash means and a gear train arranged in the first operational state to transmit the output of the motor by way of the rocking arm to the differential beam to move the differentiial beam in a sense to reduce the said deflection of the detector beam and in the second operational state to transmit a deflection, received by way of the rocking arm, of the other end of the differential beam, resulting from the said constraint of the one end of the differential beam by application of the clamp to the detector beam and a change of output of the pressure/displacement transducer, to operate the indicating instrument.

It a further embodiment of the invention two pressure/displacement transducers operate, each by way of a differential beam to produce in the first operational state the said deflection of the detector beam and in the second operational state the transmission of the displacement by the mechanical means.

Antibacklash means may be provided in the detector beam and differential beam assembly and means may also be provided for balancing the said assembly.

Embodiments of devices in accordance with the invention will now be described, by way of example, with reference to the accompanying diagrammatic drawings in which:

FIGURE 3 shows the device shown in FIGURE 2 in greater detail, together with certain ancillary equipment.

Figure 1:
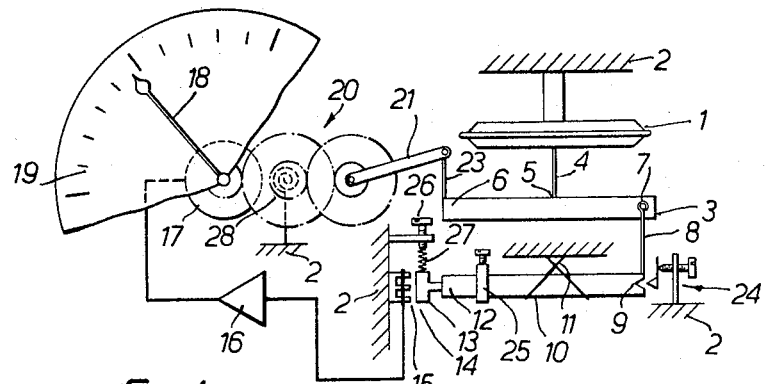
FIGURE 1 shows a pressure measuring device incorporating a single pressure/movement transducer.

In FIGURE 1, a pressure/movement transducer in the form of a capsule 1 is rigidly attached to a frame 2 (fragmentary parts only of the frame are shown). A differential beam 3 is attached to the capsule 1 by a link 4 which is clamped to the centre 5 of the beam 3. The link 4 is sufficiently resilient to allow limited pivotal movement of the beam 3 about an axis normal to the plane of the paper carrying FIGURE 1 and passing through the centre 5 of the differential beam 3. The differential beam is under constant tension due to anti-backlash spring 27 and thus movements of the capsule 1 are transmitted to the differential beam 3 via the link 4.

The differential beam 3 has a first end 6 and a second end 7. The end 7 is connected by a link 8 to the first end 9 of a detector beam 10. The link 8 could be replaced by a cross-spring or like pivot. The link 8 forms a pivotal connection between the end 7 of the differential beam 3 and the end 9 of the detector beam 10. The centre of the detector beam 10 is attached to the frame 2 by a cross-spring pivot suspension 11. At the end 12 of the beam 10 is an I-section member 13 which forms the moving member of an electrical pickoff 14. The stationary member of the pickoff 14 is an E-section coil member 15 rigidly attached to the frame 2.

Alternatively the E-section coil member 15 may be attached to the frame by controllable means. The controllable means are formed by mounting the E-section coil member 15 on the frame by means of two parallel springs, or by means of pivotal arms, so that the E-section coil member can be moved relatively to the rigid frame. The controllable means can be used for introducing required corrections into the device. The required corrections can be, for example, pressure error correction, capsule non-conformity law correction, or other corrections as required. The corrections can be introduced by mechanical means such as a movable screw, cam or lever which bears against one surface of the E-section coil member, or by electrical means such as a series of electrical inputs which are passed via an amplifier to an electrically driven motor operable to move the E-section coil member by a movement equivalent to the sum of the electrical inputs. The movement of the E-section coil member generates a signal which is applied via the amplifier 16 to the servo-motor 17 which causes the detector beam 10 to be repositioned to a new null position. Deflection of the detector beam 10 actuates the core of a linear differential transformer coupled via a link to one end of the beam 10 which causes a feedback voltage to be applied to the amplifier of the electrical means. Movement of the beam 10 continues until the feedback voltage is equal to the sum of the input voltage applied to the amplifier of the electrical means. The linear differential transformer could be interposed between an anti-backlash spring 27 and the end 12 of the beam 3.

The output of the pickoff is connected by way of a servo amplifier 16 to a servo-motor 17. The output shaft of the servo-motor 17 is connected to a pointer 18 of an indicating instrument 19 and by way of a gear train 20, which has a ratio of 900:1, to a rocking arm 21. A link 23 connects the end of the rocking arm 21 remote from the gear train 20 to the first end 6 of the differential beam 3. The link 23 has similar properties to those described with reference to the link 4. The link 23 is pivotally connected to the rocking arm 21 and clamped to the differential beam 3.

At the end 9 of the detector beam 10 is a screw-operated clamp 24 which is attached to the frame 2 and can engage a notch in the end 9 to lock the detector beam 10 in a central (null) position.

A balance weight 25 is clamped to the detector beam 10 and positional adjustment of this weight along the beam provides a means of balancing.

Between the I-section member 13 and an adjusting screw 26 mounted on the frame 2 is tension spring 27. The tension spring 27 eliminates backlash in the linkages and the pivotal connections of the device.

An anti-backlash spring 28 connected at one end to the frame 2 is arranged to eliminate backlash in the gear The links could be pivotally mounted at both ends thus eliminating the need for flexible links but this has the disadvantage of inaccuracies due to pivot bearing stiction. Alternatively both ends of each of the links could be clamped.

The device according to FIGURE 1 has two modes or states of operation. In the first mode of operation, the clamp 24 is not in operation and a change of pressure causes the capsule 1 to deflect thereby pivoting the differential beam 3 about its end 6. The end 6 is restrained from movement by the gearing of the gear train 20. The movement of the differential beam 3 is transmitted to the detector beam 10, by link 8, which beam 3 pivots about the centre of the cross springs 11. The movement of the detector beam 10 causes the I-section member 13 to be moved relative to the E-section coil member 15 resulting in an output from the pickoff 14 equivalent to the magnitude of the displacement of the I-section member 13.

The pickoff output is amplified in the servo amplifier 16 and fed to the servomotor 17 which transduces the amplified signal into movement of the pointer 18 and of the gear train 20. The gear train 20 pivots the rocking arm 21 to pivot the differential beam 3, by way of link 23, about its connection with link 4. This movement of the differential beam 3 is transmitted to the detector beam 10, via the link 8, to return the detector beam to a central (null) position at which point the output of the pickoff 14 is 0.

In the second mode of operation the clamp 24 is in operation and the pickoff 14, the servo amplifier 16 and the servomotor 17 are not in operation. In this condition the diffeerntial beam 3 is constrained to pivot about its end 7 and any movement communicated to the differential beam 3 by the link 4 causes the differential beam 3 to pivot about the end 7. The resulting movement of the end 6 is transmitted by the link 23 and the rocking arm 21 to the gear train 20. The gear train 20 in turn moves the pointer 18 to provide an indication of the movement of capsule 1.

In both modes of operation the pointer movement is a measure of the pressure change in the capsule 1 and in both modes of operation the relationship between the pointer movement and the pressure change is the same.

Figure 2:
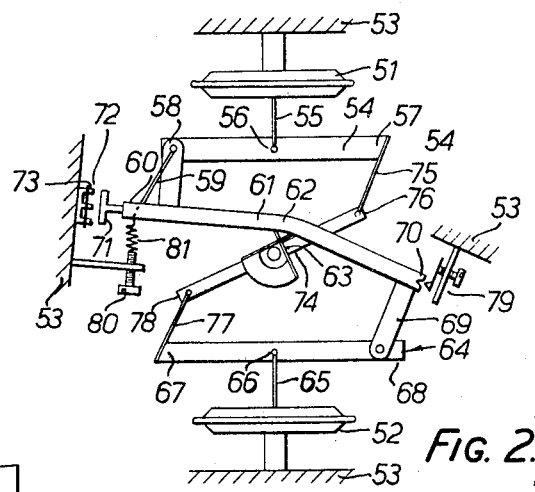
FIGURE 2 shows a pressure measuring device incorporating two pressure/movement transducers in parallel.

In FIGURE 2 a pair of capsules 51 and 52 are rigidly attached to a frame 53 (only fragmentary parts of which are shown). A differential beam 54 is attached to the capsule 51 by a link 55. The link 55 is clamped to the centre 56 of the differential beam 54. The link 55 is sufficiently resilient to allow limited pivotal movement of the differential beam 54 about an axis normal to the plane of the paper carrying FIGURE 2 and passing through the centre 56 of the differential beam 54.

The differential beam 54 has a first end 57 and a second end 58 the latter of which is connected by a cross-spring or pivot 59 to the first end 60 of a detector beam 61. The centre 62 of the detector beam 61 is attached by way of a cross-spring pivot suspension 63 to the frame 53.

A differential beam 64 is attached to the capsule 52 by a link 65. The link 65 has similar properties to those described with reference to the link 55. The link 65 is clamped to the centre 66 of the differential beam 64. The differential beam 64 has a first end 67 and a second end 68 the latter of which is connected by a pivot, or cross-spring 69 to the second end 70 of the detector beam 61. Pivot 69 is connected to the end 68 of the differential beam 64 and connected to the end 70 of the detector beam 61. An I-section member 71 is attached to the first end 60 of the detector beam 61 and forms the moving member of an electrical pickoff 72. The stationary member of the pickoff 72 is an E-section coil member 73 rigidly attached to the frame 53. Alternatively, the E-section coil member 73 may be mounted on the frame by controllable means such as hereinbefore described with reference to the device shown in FIGURE 1.

The output of the pickoff is connected by way of a servo amplifier (not shown) to a servo-motor (not shown). The output shaft of the servo-motor is connected to the pointer of an indicating instrument (not shown) and by way of a gear train (not shown) to the centre of a rocking arm 74. A link 75 connects a first end 76 of the rocking arm 74 to the first end 57 of the differential beam 54 and a link 77 connects the second end 78 of the rocking arm 74 to the first end 67 of the differential beam 64. The links 75 and 77 have similar characteristics to those described with reference to link 55. The links 75 and 77 are pivotally connected to the rocking arm 74 and clamped to the differential beams 54 and 64 respectively.

At the end 70 of the detector beam 61 is a screw operated clamp 79 which is attached to the frame 53 and can engage a notch on the end 70 to lock the detector beam 61 in a central (null) position.

Between the end 60 of the detector beam 61 and an adjusting screw 80 mounted on the frame 53 is a tension spring 81. The tension spring 81 eliminates backlash in the linkages and beam arrangement of the device.

An anti-backlash spring is arranged to eliminate backlash in the gear train.

The device according to FIGURE 2 has two modes of operation. In the first mode of operation the clamp 79 is not in engagement with the notch in the end 70 of the detector beam 61. A change in pressure in the capsules 51 and 52 causes the capsules to deflect thereby pivoting the differential beams 54 and 64 about their ends 57 and 67 respectively. The ends 57 and 67 are restrained from movement by the gearing of the gear train. The movements of the differential beams 54 and 64 are transmitted to the detector beam 61, by pivots 59 and 69 respectively, which beam 61 pivots about the centre of the cross spring 63. The movement of the detector beam 61 causes the I-section member 71 to be moved relative to the E-section coil member 73 resulting in an output from the pickoff 72 equivalent to the magnitude of the displacement of the I-section member 71.

The pickoff output is amplified by the servo amplifier and fed to the servomotor which transduces the amplifier signal into movement of the pointer and the gear train. The gear train pivots the rocking arm 74 to pivot the differential beams 54 and 64, by way of links 75 and 77 respectively, about their centres (i.e. their connections 56 and 66 with links 55 and 65 respectively). This movement of the differential beams 54 and 64 is transmitted by the pivots 59 and 69 respectively to return the detector beam 61 to a central (null) position at which point the output of the pickoff 72 is zero.

In the second mode of operation the clamp 79 engages the notch in the end 70 of beam 61 and the pickoff 72, servo amplifier and servomotor are not in operation. In this condition the differential beams 54, 64 are constrained to rotate about their ends 58 and 68 respectively and any movement communicated to the differential beams 54 and 64 by the links 55 and 65 respectively causes the differential beams 54 and 64 to pivot about their ends 58 and 68. The resulting movement of the ends 58 and 68 is transmitted by links 75 and 77 and rocking arm 74 to the gear train. The gear train in turn moves the pointer to provide an indication of the movement of capsules 51 and 52.

In both modes of operation the pointer movement is a measure of the pressure change in the capsules 51 and 52 and in both modes of operation the relationship between the pointer movement and the pressure change is the same. In the event of failure of one of the capsules 51 or 52 the device will continue to operate and give an indication on the indicating instrument of a pressure change in the operative capsule.

Reference will now be made to FIGURE 3, in which like integers to those shown in FIGURES 1 and 2 have like reference numerals. The capsules 51, 52 are rigidly attached to the frame and the differential beam 54 is attached to the capsule 51 by the link 55, which link is clamped to the centre of the differential beam 54 at its end remote from the capsule 51. The end 58 of the beam 54 is connected by pivot 59 to one end of the detector beam 61. The centre of the detector beam 61 is attached by the cross-spring pivot suspension 63 to the frame.

Differential beam 64 is attached to the capsule 52 by link 65, which link 65 is clamped to the centre 66 of the beam 64 at its end remote from the capsule 52. End 68 of the beam 64 is connected by pivot 69 to the end 60 of the detector beam 61. I-section member 71 is attached to the end 60 of the detector beam 61 and forms the moving member of the electrical pickoff 72. The stationary member of the pickoff 72 is E-section coil member 73-rigidly attached to the frame.

A torque motor 82 is interconnected with the E-section coil member 73, the input of said torque motor 82 being connected via an amplifier 83 with a linear differential transformer 84 connected to the end 70 of detector beam 61. The amplifier 83 is serially connected to a P.E.C. generator and flight encoder 135 as shown in FIGURE 3.

The output of the pickoff is connected via a lead 85 and the servo-amplifier 16 to the servo motor 17. The output shaft 86 of the servo-motor 17 is connected via a disengageable servo-drive 87, gear wheel 88 and gearing 89 to altimeter counter 90 and the pointer 18 of the indicating instrument.

A baroset knob 140 coupled to gearing 141 is provided which knob can be pressed in the direction indicated by arrow 142 in order to facilitate fastener winding.

The output shaft 86 of the servo-motor 17 is also coupled by the servo-drive 87, the gear wheel 88, a shaft 91 and intermediate gearing 92 to the centre of the rocking arm 74. The link 75 connects the end 76 of the rocking arm 74 to the end 57 of the differential beam 54 and the link 77 connects the end 78 of the rocking arm 74 to the end 67 of the beam 64. The pivot 59 extends through a hole in the end 70 of the detector beam 61 and is engageable by a clamping device 94, shown in greater detail in FIGURES 4A and 4B.

Figure 4A:
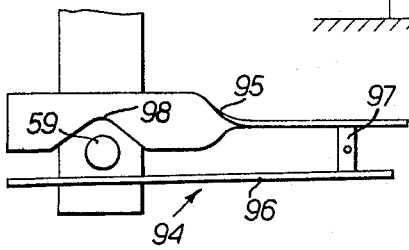
FIGURES 4A and 4B show a clamp for use with a device in accordance with the invention in its inoperative and operative positions respectively.
Figure 4B:
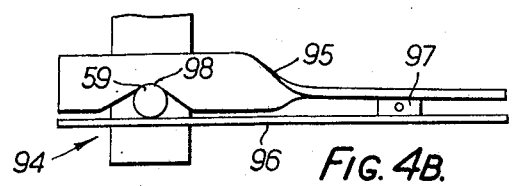

As shown in FIGURES 4A and 4B, the clamp 94 comprises two resilient members 95, 96 which are forced apart by a rotatable key 97. The member 95 has an enlarged end portion having a notch 98 which cooperates with the end of the pivot 59 and the member 96 to lock the end 58 of the differential beam 54 against angular movement when the key 97 is turned to the position shown in FIGURE 4B. The clamp is shown in its open position in FIGURE 4A. Key 97 is rotatable by cooperating gearwheels 99, 100, the latter of which is connected by a shaft 101 and linkage 102 to a shaft 103. Shaft 103 is connected via gearing 104 to a flag 105; via rod 106 to a relay lock 107; and via a link 108 and an axially movable rod 109 to a rod 110 which carries one part of the servo-drive 87 which cooperates with gear wheel 88.

Also carried by shaft 103 is a rod 111 which cooperates with a shorts motor 112 which is drivable by a high-inertia motor 113. An operating member 123 of a switch 124 is carried by the shaft 103, which switch 124 is coupled via a lead 125 with the relay lock 107.

Switch 124 is also connected via a lead 126 to the high-inertia motor 113 and via a lead 127 to switch 120 of a mode switch 114. Switch 121 of the mode switch 114 is connected via a lead 128 to an input of the P.E.C. generator and switch 122 is connected via a lead 129 to the input of a variable transformer 130. An output 131 from the transformer 130 is connected via a rectifier 132 to a flag motor 133.

The device according to FIGURE 3 has two modes of operation, each of which can be selected by means of the mode switch 114. In the first mode of operation the clamp 94 is not in engagement with the end of the pivot 59. In this mode, the various integers of the device and the mode switch 114 are in the positions shown in FIGURE 3 and the clamp 94 is in the position shown in FIGURE 4A. Switches 120, 121 are closed and switch 122 is open. A change in pressure in the capsules 51, 52 causes the capsules to deflect thereby pivoting the differential beams 54 and 64 about their ends 57 and 67 respectively. The ends 57 and 67 are restrained from movement by the gearing of the gear train. The movement of the differential beams 54 and 64 is transmitted to the detector beam 61, by pivots 59 and 69 respectively, which beam 61 pivots about the centre of cross-spring 63. Movement of the detector beam 61 causes the I-section member 71 to be moved relative to the E-section coil member 73 resulting in an output from pickoff 72 equivalent to the displacement of the I-section member 71.

The output from pickoff 72 is amplified by the servo-amplifier 16 and fed to the servo-motor 17. The rotational output from the servo motor 17 is transmitted via output shaft 86, servo-drive 87, the gear wheel 88 and the gearing 89 to the pointer 18 and altimeter counter 90. Rotation of the gear wheel 88 is also transmitted by the shaft 91 and the intermediate gearing 92 to the rocking arm 72 which is rotated to pivot the differential beams 54, 64 by way of the links 75 and 77, about their centres. This movement of the differential beams 54, 64 is transmitted by the pivots 59, 69 respectively to return the detector beam 61 to a central (null) position at which point the output of the pickoff 72 is zero.

In the second mode of operation, the mode switch 114 is turned to a position in which switches 120, 121 are open and switch 122 is closed. In this position, the high-inertia motor is activated to drive the shorts motor 112 which causes, via the rod 111, rotation of the shaft 103 in the direction indicated by arrow 115. Rotation of the rod 103 effects axial movement of link 102 in the direction indicated by arrow 116 which, in turn, effects rotation of the shaft 101 in the direction indicated by arrow 117. Such rotation causes rotation of the gear wheel 100 which effects rotation of the gear wheel 99 which turns the key 97 of the clamp 94 to lock the pivot 59 between resilient members 95 and 96.

Rotation of the shaft 103 also effects axial displacement of the rod 109 in the direction indicated by arrow 118 which, through rod 110, disengages the servo-drive 87. Further, relay lock is de-activated and rod 106 moves downwardly out of contact with the relay lock.

In the second mode, the pickoff 72, the servo amplifier 16 and the servo-motor 17 are not in operation. In this condition the differential beams 54, 64 are constrained to rotate about their ends 58, 68 respectively and any movement communicated to the differential beams 54, 64 by links 55, 65 respectively causes the differential beams 54, 64 to pivot about their ends 58, 68. The resulting movement of the ends 58, 68 is transmitted by links 75 and 77 to rocking arm 74 from which the movement is transmitted by the shaft 91, intermediate gearing 92, gear wheel 88 and gearing 89 to the altimeter counter 90 and the pointer 18.

In an alternative arrangement the capsules 51 and 52 are connected to two pressure sources and the device measures changes in difference of pressure between the pressures in the capsules.

Referring again to FIGURE 1, the beam assembly in an alternative arrangement is modified by the deletion of the detector beam and the rearrangement of the pickoff, clamping, balance and backlash arrangements. In this alternative arrangement the I-section member of the pickoff is attached to, and the clamp 24 is arranged to cooperate with, the end 7 of the differential beam 3. In this alternative arrangement it is desirable although not essential to provide means for restraining the differential beam to prevent longitudinal motion thereof.

An alternative arrangement similar to that described above is also possible in the device described with reference to FIGURE 2.

I claim:
1. A device for measuring a displacement including:
   means for transmitting a displacement signal,
   said transmitting means including a first portion movable in response to the measured value and a second portion mechanically connected to said first portion,
   output means to receive an output signal representing said displacement and mechanically connected to said first portion,
   feedback means responsive to displacement of said second portion to move said output means and thereby said first portion to shift said second portion back to its null position, whereby said device operates in a null mode, and
   clamping means operative to constrain said second portion in its null position to render said feedback means inoperative whereby movement of said first portion is transmitted directly to said output means.
2. A device according to claim 1 in which said feedback means includes transducer means providing an output in dependence upon displacement of said second portion, an amplifier, connected to the transducer to amplify the output of the transducer, and a servo-motor responsive to the output of the amplifier to move the output means independence thereon.
3. A device according to claim 2 in which the output means comprises an indicating instrument with a pointer and, wherein the servo-motor is connected to move a pointer of the indicating instrument.
4. A device according to claim 3 in which the first portion comprises a differential beam arranged to be deflected at one end, and in which a pressure responsive capsule is connected to said differential beam by a flexible link.
5. A device according to claim 4 in which the second portion comprises a detector beam arranged to be deflected by said deflection of said differential beam.
6. A device according to claim 5 in which the transducer means includes:
   an inductive pickoff arranged to sense the said deflection of the detector beam and to provide an output which is fed to the said amplifier.
7. A device according to claim 6 in which the inductive pickoff comprises:
   a moving member in the form of an I-section member attached to one end of the detector beam,
   and a stationary member in the form of an E-section coil member.
8. A device according to claim 6 including:
   a rocking arm arranged to pivot about a rocking axis, and having a distal end connected to said differential beam to be deflected thereby,
   anti-backlash means biasing said rocking arm in a predetermined direction about said rocking axis, and
   a gear train interconnecting said rocking arm with said pointer whereby to transmit the output from the servo-motor by way of the rocking arm to the differential beam to move the differential beam in a sense to reduce the said deflection of the detector beam, and when said clamping means is operative to transmit a deflection of the differential beam, by way of the rocking arm to the pointer.

References Cited

UNITED STATES PATENTS

| | | | |
|---|---|---|---|
| 2,729,780 | 1/1956 | Miller et al. | 73—410 X |
| 3,009,358 | 11/1961 | Angus | 73—384 |
| 3,160,012 | 12/1964 | Andresen | 73—384 |
| 3,282,110 | 11/1966 | Weir | 73—398 |

FOREIGN PATENTS

| | | |
|---|---|---|
| 903,186 | 8/1962 | Great Britain. |
| 955,810 | 4/1964 | Great Britain. |

LOUIS R. PRINCE, Primary Examiner

J. W. ROSKOS, Assistant Examiner